United States Patent
Luo et al.

(10) Patent No.: US 11,057,440 B2
(45) Date of Patent: Jul. 6, 2021

(54) METHOD FOR PROCESSING MESSAGE IN GROUP SESSION, STORAGE MEDIUM, AND COMPUTER DEVICE

(71) Applicant: Tencent Technology (Shenzhen) Company Limited, Shenzhen (CN)

(72) Inventors: Weibang Luo, Shenzhen (CN); Jisheng Huang, Shenzhen (CN); Haojun Hu, Shenzhen (CN); Qingjie Lin, Shenzhen (CN); Wenxiao Zheng, Shenzhen (CN); Yi Duan, Shenzhen (CN); Zhaowei Wang, Shenzhen (CN); Chao Lin, Shenzhen (CN); Canhui Huang, Shenzhen (CN); Hao Hu, Shenzhen (CN); Zhe Cheng, Shenzhen (CN); Yu Wu, Shenzhen (CN); Xuyu Gui, Shenzhen (CN); Zhaopeng Liang, Shenzhen (CN); Yifan Zhu, Shenzhen (CN); Yuyang Peng, Shenzhen (CN); Kunli Deng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 73 days.

(21) Appl. No.: 16/525,224

(22) Filed: Jul. 29, 2019

(65) Prior Publication Data
US 2019/0349411 A1 Nov. 14, 2019

Related U.S. Application Data

(63) Continuation of application No. PCT/CN2018/085496, filed on May 3, 2018.

(30) Foreign Application Priority Data
May 17, 2017 (CN) .......................... 201710349384.1

(51) Int. Cl.
H04L 29/06 (2006.01)
H04L 29/08 (2006.01)
G06Q 50/00 (2012.01)

(52) U.S. Cl.
CPC ...... *H04L 65/1069* (2013.01); *H04L 63/0892* (2013.01); *H04L 65/403* (2013.01); *H04L 67/146* (2013.01); *G06Q 50/01* (2013.01)

(58) Field of Classification Search
CPC ............ H04L 65/1069; H04L 63/0892; H04L 65/403; H04L 67/146; H04L 67/12;
(Continued)

(56) References Cited

U.S. PATENT DOCUMENTS

2011/0276897 A1* 11/2011 Crevier ............... H04L 61/1564
715/752
2016/0103803 A1* 4/2016 Lam .................... G06F 16/9574
715/234

(Continued)

FOREIGN PATENT DOCUMENTS

CN 101163118 A 4/2008
CN 101188578 A 5/2008
(Continued)

OTHER PUBLICATIONS

Tencent Technology, WO, PCT/CN2018/085496, Aug. 9, 2018, 4 pgs.
(Continued)

*Primary Examiner* — Caroline H Jahnige
(74) *Attorney, Agent, or Firm* — Morgan, Lewis & Bockius LLP

(57) ABSTRACT

A method for processing a message in a group session of a social networking application is performed at a computer device. The method includes: receiving a session message in a group session; extracting a child application identifier
(Continued)

carried in the session message; determining a session identifier corresponding to the group session to which the session message belongs; obtaining page data that corresponds to the child application identifier and that is associated with the session identifier; and rendering, according to the page data, a child application page in a child application that is invoked in an environment provided by the social networking application and that corresponds to the child application identifier.

17 Claims, 8 Drawing Sheets

(58) Field of Classification Search
CPC ....... H04L 63/104; G06Q 50/01; H04W 4/21; H04W 4/08; G06F 9/546
See application file for complete search history.

(56) References Cited

U.S. PATENT DOCUMENTS

2016/0342802 A1　11/2016　Xuan et al.
2017/0357442 A1*　12/2017　Peterson ............. G06F 3/04886

FOREIGN PATENT DOCUMENTS

| CN | 103885666 A | 6/2014 |
| CN | 106569900 A | 4/2017 |
| CN | 107229526 A | 10/2017 |

OTHER PUBLICATIONS

Tencent Technology, IPRP, PCT/CN2018/085496, dated Nov. 19, 2019, 5 pgs.
Tencent Technology, ISR, PCT/CN2018/085496, dated Aug. 9, 2018. 2pgs.

* cited by examiner

METHOD FOR PROCESSING MESSAGE IN GROUP SESSION, STORAGE MEDIUM, AND COMPUTER DEVICE

CROSS-REFERENCE TO RELATED APPLICATIONS

This application is a continuation application of PCT/CN2018/085496, entitled "METHOD FOR PROCESSING MESSAGE IN GROUP SESSION, STORAGE MEDIUM, AND COMPUTER DEVICE" filed on May 3, 2018, which claims priority to Chinese Patent Application No. 201710349384.1, filed with the Chinese Patent Office on May 17, 2017 and entitled "METHOD FOR PROCESSING MESSAGE IN GROUP SESSION, APPARATUS, STORAGE MEDIUM, AND COMPUTER DEVICE", all of which are incorporated by reference in their entirety.

FIELD OF THE TECHNOLOGY

This application relates to the field of computer technologies, and in particular, to a method for processing a message in a group session, a storage medium, and a computer device.

BACKGROUND OF THE DISCLOSURE

An application is an encoded instruction sequence that may be performed by a terminal having an information processing capability, such as a computer, to obtain a result, or a symbolic instruction sequence or a symbolic statement sequence that may be automatically converted into an encoded instruction sequence. Currently, a user may install various applications on the terminal, for example, a photographing application, a social application, and a mail application, so that these applications installed on the terminal may be used to implement various functions, for example, a photographing function, a social function, and an email function management function.

In addition, after receiving a message related to an application, the user needs to switch to the application for the message according to a user instruction, and process the message in the application. However, each time after receiving a message, a user needs to switch to an application targeted by the message, consuming a relatively long time, and causing relatively low message processing efficiency.

SUMMARY

According to various embodiments provided in this application, a method for processing a message in a group session, a storage medium, and a computer device are provided.

According to a first aspect of this application, a method for processing a message in a group session of a social networking application is performed at a computer device having one or more processors and memory storing a plurality of programs to be executed by the one or more processors, the method comprising:

receiving, by the computer device, a session message in a group session;

extracting, by the computer device, a child application identifier carried by the session message;

determining, by the computer device, a session identifier corresponding to the group session to which the session message belongs, obtaining, by the computer device, page data that corresponds to the child application identifier and that is associated with the session identifier; and rendering, by the computer device according to the page data, a child application page in a child application that is invoked in an environment provided by the social networking application and that corresponds to the child application identifier.

According to a second aspect of this application, one or more non-transitory computer readable storage mediums storing a plurality of machine readable instructions are provided, and when the plurality of machine readable instructions are executed by one or more processors of a computer device, the one or more processors are caused to perform the aforementioned method for processing a message in a group session of a social networking application.

According to a third aspect of this application, a computer device includes memory and one or more processors, the memory storing a plurality of computer-readable instructions that, when executed by the one or more processors, cause the computer device to perform the aforementioned method for processing a message in a group session of a social networking application.

Details about one or more embodiments of this application are described in the following accompanying drawings and descriptions. Other features, objectives, and advantages of this application become clearer from the specification, the accompanying drawings, and the claims.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make the objectives, the technical solutions, and the advantages of this application clearer, the following further describes this application in detail with reference to the accompanying drawings and the embodiments. It should be understood that the specific embodiments described herein are only used to describe this application, instead of limiting this application.

Figure 1:
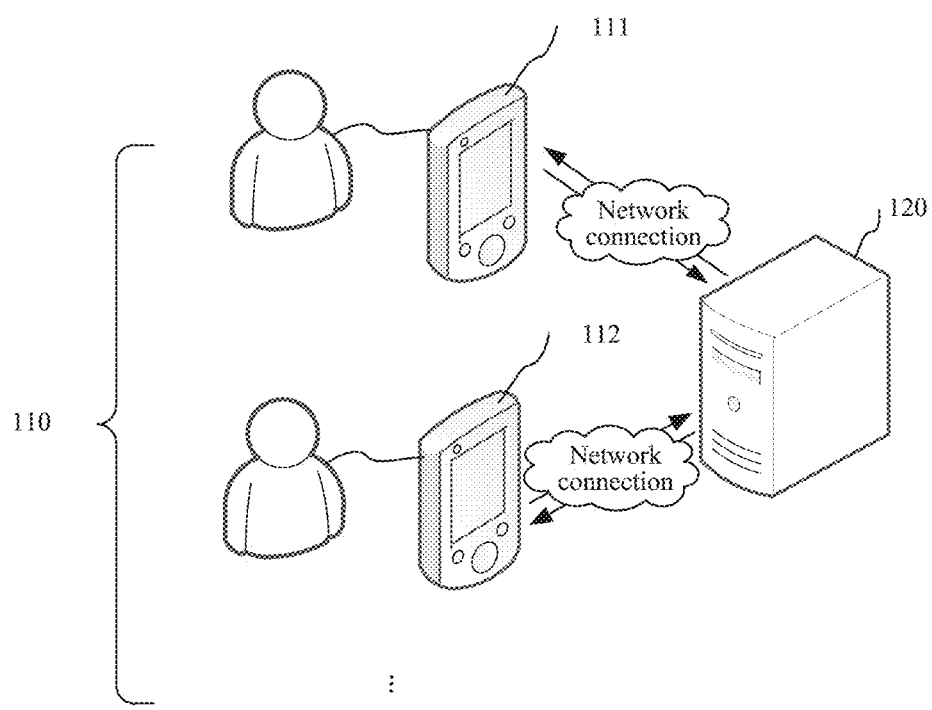
FIG. 1 is a diagram of an application environment of a method for processing a message in a group session according to an embodiment.

FIG. 1 is a diagram of an application environment of a method for processing a message in a group session according to an embodiment. Referring to FIG. 1, the method for processing a message in a group session is applied to a message processing system in the group session. The message processing system in the group session includes a terminal 110 and a server 120. The terminal 110 includes at least a first terminal 111 and a second terminal 112. The terminal 110 is connected to the server 120 by using a network. A parent application run in an OS of the terminal 110 is configured to perform the method for processing a message in a group session. The terminal 110 may be specifically desktop terminals or mobile terminals, and the mobile terminal may be specifically at least one of a mobile phone, a tablet computer, a notebook computer, and the like. The server 120 may be specifically an independent physical server or a physical server cluster. The server 120 may include an open service platform, or may include an access server for accessing an open service platform.

Figure 2:
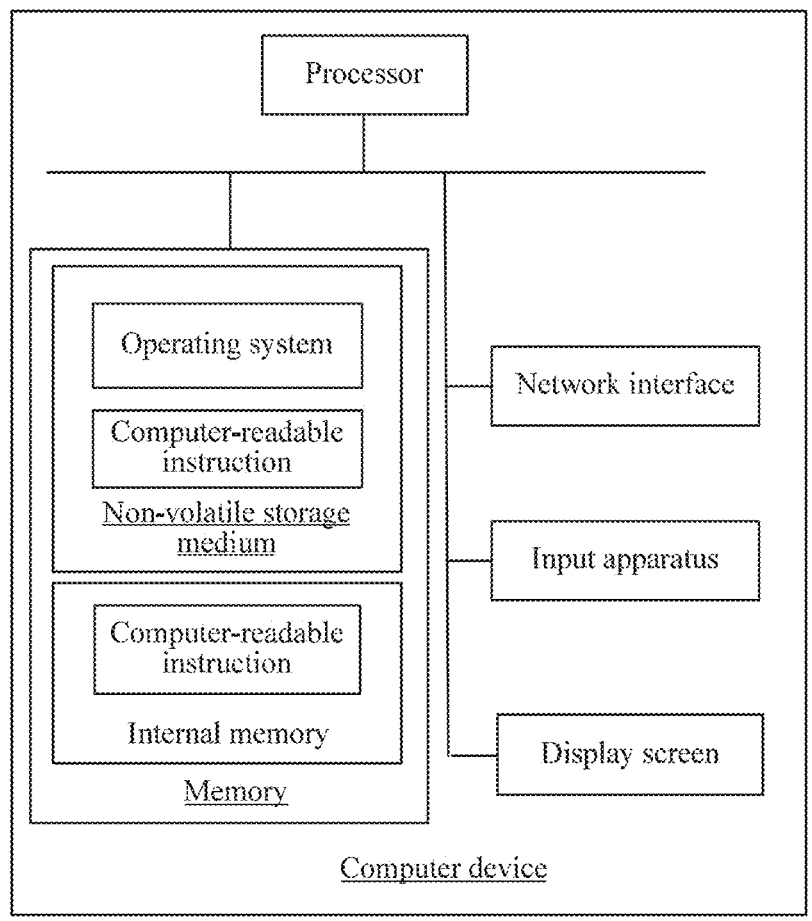
FIG. 2 is an internal schematic structural diagram of a terminal configured to implement a method for processing a message in a group session according to an embodiment.

FIG. 2 is a schematic diagram of an inner structure of a computer device according to an embodiment. The computer device may be specifically the terminal 110 shown in FIG. 1. As shown in FIG. 2, the terminal includes a processor, a memory, a network interface, a display screen, and an input apparatus that are connected by using a system bus. The memory includes a non-volatile storage medium and an internal memory. The non-volatile storage medium of the computer device may store an OS and computer-readable instructions. The computer-readable instructions, when executed by the processor, may cause the processor to perform a method for processing a message in a group session. The processor of the computer device is configured to provide calculation and control capabilities, to support running of the entire computer device. The internal memory of the computer device may store a computer-readable instruction, and when the computer-readable instruction is executed by the processor, the processor may be caused to perform the method for processing a message in a group session. The network interface is configured to perform network communication with the server, for example, send a cooperative operation authorization request to the server, receive an authorization response returned from the server, or the like. A display screen of the computer device may be a liquid crystal display screen, an electronic ink display screen, or the like. The input apparatus may be a touch layer covering the display screen, may be a key, a trackball, or a touchpad disposed on a terminal housing, or may be an extraneous keyboard, touchpad, mouse, or the like. The computer device may be a mobile phone, a tablet computer, a personal digital assistant, a wearable device, or the like. A person skilled in the art may understand that the structure shown in FIG. 2 is only a block diagram of a part of structure related to the solution of this application, and does not constitute any limitation to a terminal to which the solution of this application is applied. A specific computer device may include more or less components than those shown in the figure, or some components are combined, or a different component deployment is used.

Figure 3:
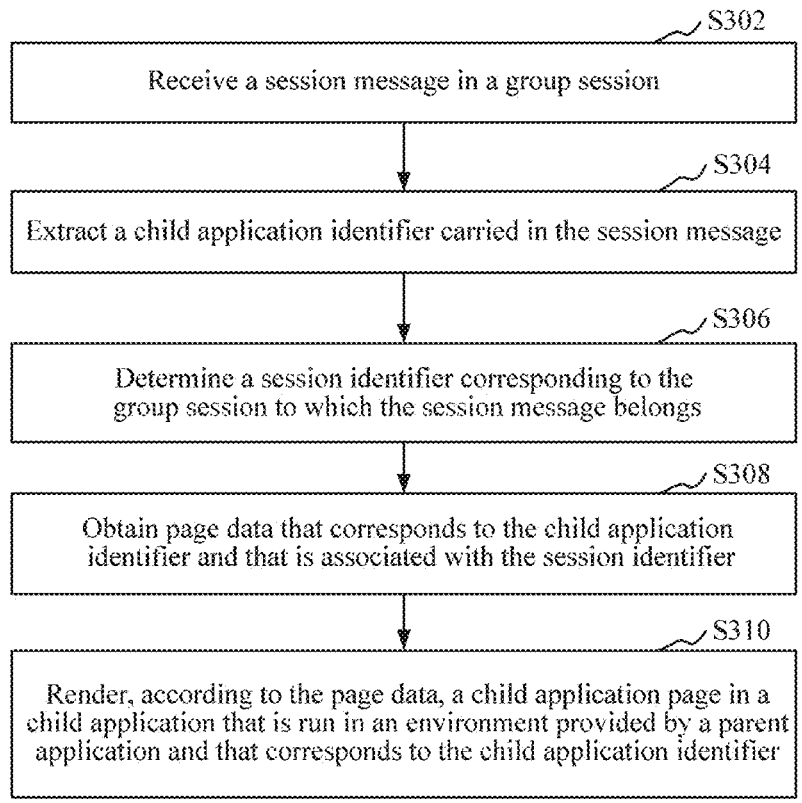
FIG. 3 is a schematic flowchart of a method for processing a message in a group session according to an embodiment.

FIG. 3 is a schematic flowchart of a method for processing a message in a group session according to an embodiment. In this embodiment, descriptions are provided mainly by using an example in which the method is applied to the terminal 110 in FIG. 1. The method for processing a message in a group session is performed by using a parent application run on the terminal 110. Referring to FIG. 3, the method specifically includes the following steps:

S302: Receive a session message in a group session.

The group session is a process in which at least three users interact with each other. The session message is a message initiated in the group session, and may include a message initiated in the group session by any user in the group session.

In an embodiment, the terminal may establish, by using the parent application run on the terminal, a group used for performing a group session. The group is a user set including at least three user identifiers, and users identified by user identifiers in the group may perform information sharing and message exchange with each other based on the group. The group may be a chat group or a discussion group. The group may be a stable group that exists for a long time once being established, or may be a temporary group that is dismissed after a validity period expires.

In an embodiment, the session message may be a shared message, and shared data specified by the shared message may be text data, voice data, video data, image data, or the like. The shared data specified by the shared message may be dynamic data, or may be static data. The dynamic data may be continuously changing data, or may be periodically changing data.

Specifically, an OS is run on the terminal, and the parent application is run in the OS. The OS is a computer program managing and controlling hardware and software resources of the terminal, and is most basic system software directly run on a bare-metal terminal. An application needs to be run under the support of the OS. The OS may be a desktop OS such as the Windows OS, the Linux OS, or the Mac OS (an Apple desktop OS), or may be a mobile OS such as the iOS (an Apple mobile terminal OS) or the Android OS.

The parent application is a native application. The native application is an application that may be directly run on the OS. The parent application may be a social application, a mail application, a game application, or the like. The social application includes an instant messaging application, a social networking application, a live broadcast application, or the like. The parent application may be specifically a WeChat program.

S304: Extract a child application identifier carried in the session message.

The child application identifier is used to identify a corresponding child application. The child application identifier may be a character string that includes at least one type of character, including digit, letter, or symbol. The child application identifier may be specifically a unique identifier (AppID) of a child application.

In an embodiment, the terminal may directly detect, when receiving a session message in a group session by using a parent application, whether the session message includes a child application identifier, and extract a detected child application identifier when detecting that the session message includes the child application identifier.

In an embodiment, after receiving a session message and after detecting a display instruction for displaying message content of the session message, when displaying, according to the detected display instruction, the message content corresponding to the session message, the terminal may alternatively detect whether the session message includes a child application identifier, and extracts the detected child application identifier when detecting that the session message includes the child application identifier.

In an embodiment, after displaying message content of a session message on a session interface corresponding to a group session, the terminal may alternatively detect a triggering event for the displayed message content, and when detecting the triggering event, detect whether the session message includes a child application identifier, and extract the detected child application identifier when detecting that the session message includes the child application identifier.

The displayed message content may be a card obtained by splicing text content related to a child application and/or content of a child application page. The displayed message content may be used as an operation entry for entering the child application when the displayed message content is triggered. The triggering event may perform triggering in a plurality of triggering manners, such as a touch operation, a click operation, pressing a physical key, a sound control manner, and a device wobble operation.

In an embodiment, when a child application is run in a parent application run on the first terminal, the first terminal may share, by using a session message, a group session performed in the parent application by the child application. After receiving the session message in the group session by using the parent application, the second terminal extracts a child application identifier in the session message. It may be understood that, the second terminal may also share, by using the session message, the child application in a group session performed in the parent application, and the first terminal receives the session message in the group session by using the parent application.

Specifically, the parent application is an application that carries the child application, and provides an environment for implementing the child application. The parent application is a native application. The native application is an application that may be directly run on the OS. The child application is an application that may be implemented in the environment provided by the parent application. The child application may be specifically a social application, a file management application, a mail application, a game application, or the like. The parent application may be specifically a WeChat program, and the corresponding child application may be referred to as an applet.

Figure 4:
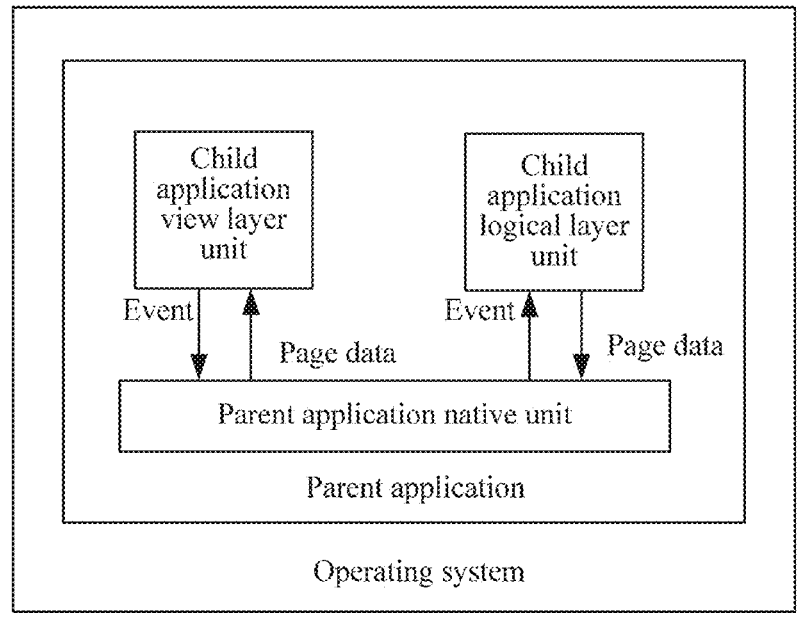
FIG. 4 is a schematic diagram of a relationship between an operating system (OS), a parent application, a child application, and a child application page according to an embodiment.

FIG. 4 is a schematic diagram of a relationship between an OS a parent application, a child application, and a child application page according to an embodiment. Referring to FIG. 4, an OS is run on the terminal, and a parent application is run in the OS, and the parent application provides a running environment to a child application. The terminal may create, according to a package of the child application, a child application logical layer unit and a corresponding child application view layer unit that are used for implementing the child application. The child application logical layer unit may be configured to execute page logic code in the package, and the child application view layer unit may be configured to execute page structure code in the package, or execute page style code in the package. The page logic code, the page structure code, and the page style code in the package may be collectively referred to as page code.

S306: Determine a session identifier corresponding to the group session to which the session message belongs.

The session identifier is used for identifying a corresponding session. The session may include a group session, a double session, and the like. The session identifier may be a character string that includes at least one type of character, namely, digit, letter, or symbol. The session identifier may be specifically a unique identifier (openGID) of the group session.

Specifically, after extracting the child application identifier from the session message, and determining that the session message is related to the child application, the terminal may determine the group session to which the session message belongs, and search for the session identifier corresponding to the group session.

In an embodiment, after receiving a session message in a group session by using a parent application, the terminal may detect a session identifier obtaining instruction. The session identifier obtaining instruction may be triggered when a preset triggering operation is detected, or may be triggered at a specified time, or may be triggered when a specified triggering event occurs. The preset triggering operation may be an operation such as a touch operation, a click operation, pressing a physical key, a sound control, or a device wobble operation. Triggering at a specified time may be triggering within a time after a session message is received, or may be triggering within a time after message content of the session message is displayed. The specified triggering event may be a touch operation or a click operation performed on the message content of the displayed session message.

In an embodiment, after receiving a session message in a group session by using a parent application, the terminal may specifically detect a display instruction for displaying message content of the session message, and after detecting the display instruction, display the message content of the received session message on a session interface corresponding to the group session. The terminal may specifically further detect a triggering event for the displayed message content by using the parent application, and when detecting the triggering event, determine to enter a child application by using the displayed message content as an entry, thereby determining a session identifier corresponding to the group session to which the session message used for entering the child application belongs.

S308: Obtain page data that corresponds to the child application identifier and that is associated with the session identifier.

The page data is data used for being presented on the child application page. The page data may be text data, voice data, video data, image data, or the like. The page data may be dynamic data, or may be static data. The dynamic data may be continuously changing data, or may be periodically changing data. The page data associated with the session identifier is data related to the group session. The data related to the group session may be data uploaded or edited by using a member of the group session. For example, the child application is a group photo album applet, and the data related to the group session may be specifically picture data uploaded by a member of the group session.

In an embodiment, the page data that corresponds to the child application identifier and that is associated with the session identifier may be page data of a page that is uniformly selected for the child application corresponding to the child application identifier. For example, the uniformly selected page is a home page of the child application, and the home page of the child application is a page that is directly displayed after the child application is loaded. The page data that corresponds to the child application identifier and that is associated with the session identifier may be alternatively page data of a particular page that belongs to the child application corresponding to the child application identifier and that is associated with the session identifier, for example, page data of a page on which mail content in a mail application is located, or page data of a page on which weather information in a weather application is located.

In an embodiment, after determining a session identifier corresponding to a group session to which a session message belongs, the terminal may specifically transmit the session identifier to a child application. Then, the child application initiates a page data obtaining request for obtaining page data associated with the session identifier. Then, a parent application obtains, according to the page data obtaining request, from a server corresponding to the child application, the page data that corresponds to a child application identifier and that is associated with the session identifier.

In an embodiment, the terminal may alternatively send, by using the parent application, the page data obtaining request to a server corresponding to the parent application, so that the server corresponding to the parent application obtains, from the server corresponding to the child application identifier, the page data that corresponds to the child application identifier and that is associated with the session identifier.

In an embodiment, each time after obtaining, according to a page data obtaining request sent by the terminal, corresponding page data from a server corresponding to a child application, a server corresponding to a parent application may correspondingly store the obtained page data and the page data obtaining request, to directly read and return the page data when another terminal requests the page data by using a page data obtaining request.

Further, after sending, by using the parent application, the page data obtaining request to the server corresponding to the parent application, when valid page data that corresponds to the child application identifier and that is associated with the session identifier is cached on the server corresponding to the parent application, the terminal may receive cached page data that is returned in response to the page data obtaining request by the server corresponding to the parent application; or when no page data that corresponds to the child application identifier and that is associated with the session identifier is cached on the server corresponding to the parent application; or cached page data that corresponds to the child application identifier and that is associated with the session identifier becomes invalid, the terminal may receive page data that is obtained from the server corresponding to the child application and that is returned by a server in response to the page data obtaining request.

S310: Render, according to the page data, a child application page in a child application that is run in an environment provided by the parent application and that corresponds to the child application identifier.

The child application that is run in the environment provided by the parent application and that corresponds to the child application identifier may be already started in advance, and run at a rear end instead when the session interface is displayed by using the parent application. When the session interface is displayed by using the parent application, the child application that is run in the environment provided by the parent application and that corresponds to the child application identifier may be alternatively triggered, by triggering the message content of the session message displayed on the session interface, to be started and run.

Specifically, the terminal may use the child application view layer unit of the child application to start pre-loading of a common resource, so that after receiving page data, the terminal performs page rendering according to a common resource and page data required by the page rendering, and returns a rendering completion notification to the child application logical layer unit. The common resource is a resource shared for generating different child application pages, for example, a rendering engine, common page structure code, or common style data.

According to the method for processing a message in a group session, the parent application is run in the OS, and then the parent application may receive the session message in the group session, extract the child application identifier carried in the session message, and determine the session identifier corresponding to the session message. In this way, the parent application may obtain, according to the child application identifier and the session identifier, the page data that corresponds to the child application identifier and that is associated with the session identifier, to implement the rendering of the child application page related to the session in this way, when the parent application is run, the received message may be directly processed in the environment provided in the parent application, and subsequent data processing in a group session range may be performed, in the child application corresponding to the child application identifier, by using the rendered child application page related to the session, avoiding time consuming caused by switching to an application, targeted by the message, to perform message processing, and improving message processing efficiency.

In an embodiment, the method for processing a message in a group session further includes: obtaining a verification credential in the session message; and checking the obtained verification credential. It may be understood that, these steps may be specifically performed after S304. When the check of the verification credential succeeds, step S308 includes: transmitting the session identifier to the child application that is run in the environment provided by the parent application and that corresponds to the child application identifier; obtaining a page data obtaining request initiated for the session identifier by the child application; and obtaining, according to the page data obtaining request, the page data corresponding to the child application identifier.

The verification credential is data based on which security verification is performed. The verification credential may be a password, a sliding gesture, or the like. The password may include at least one of a digit, a letter, and a punctuation. The sliding gesture may be represented by using a location point sequence including several location points sequentially arranged. The verification credential may correspond one-to-one to the session message, or may be a uniform verification credential.

In an embodiment, the terminal may extract, by using a parent application, a character from a location at which a preset verification credential is located in a session message, to obtain a verification credential corresponding to the session message, and check the obtained verification credential. The checking the verification credential may be specifically directly checking, through comparison, whether the obtained verification credential is consistent with a verification credential that is already set. If the obtained verification credential is consistent with a verification credential that is already set, the check succeeds. If the obtained verification credential is inconsistent with a verification credential that is already set, the check fails.

In an embodiment, a character extracted by the terminal from a session message by using a parent application may be an encrypted verification credential. The terminal may first decrypt the encrypted verification credential by using the parent application, to obtain a decrypted verification credential, and then compare the decrypted verification credential with a verification credential that is already set.

In an embodiment, the terminal may detect, by using a parent application, a track formed by a sliding gesture, to obtain a verification credential corresponding to the session message, and check the obtained verification credential. The checking the verification credential may be specifically directly checking, through comparison, whether the detected track is consistent with a track that is already set. If the detected track is consistent with a track that is already set, the check succeeds. If the detected track is inconsistent with a track that is already set, the check fails.

Further, when the check of the verification credential succeeds, the parent application transmits the determined session identifier corresponding to the group session to which the session message belongs to the child application that is run in the environment provided by the parent application and that corresponds to the child application identifier. A child application logical layer processing unit runs logical code of a child application page, and initiates a page data obtaining request for obtaining page data associated with the session identifier. The child application logical layer processing unit then invokes a communications interface provided by the parent application, and uses the parent application to send the page data obtaining request to a server corresponding to the child application. The server corresponding to the child application then returns, in response to the page data obtaining request, the page data corresponding to the child application identifier.

In the foregoing embodiment, the page data that corresponds to the child application identifier and that is associated with the session identifier, only after the check of the verification credential in the session message succeeds, and the rendering of the child application page is performed, ensuring security of the page data that is related to the group session and that belongs to the child application.

In an embodiment, step S308 includes: determining a target shared page specified by the session message, where the target shared page belongs to the child application corresponding to the child application identifier; and obtaining page data that corresponds to the child application identifier, that is associated with the session identifier, and that belongs to the target shared page. The rendering, according to the page data, a child application page includes: rendering, according to the page data, the target shared page belonging to the child application.

The target shared page is a page that is intended to be shared and that belongs to the child application. Specifically, when running the child application in the environment provided by the parent application, the first terminal initiating the session message may share any page that belongs to the child application. When sharing, by initiating a session message, a particular page that belongs to the child application, the first terminal may add a page path and a page parameter of the page to the session message.

In an embodiment, the target shared page may be a page displayed on the terminal by the child application that is run, or may be a partial area of a page that is displayed. For example, when the child application is a mail application, all content of a mail displayed on the terminal by the mail application includes a mail subject, a mail text, a receiver, a sender, and the like. The target shared page may be a currently displayed page, and includes all the content of the mail. The target shared page may be alternatively a partial page of a currently displayed page, and includes only the mail text.

In an embodiment, in the method for processing a message in a group session, the step of determining a target shared page specified by the session message includes: extracting a page path and a page parameter in the session message; and determining, according to the page path and the page parameter, the target shared page specified by the session message.

The page path may be specifically a path on a server or a local path, and may be an absolute or a relative page path. The page parameter is a parameter used for describing page content.

Specifically, the page path and the page parameter conform to particular data formats. The terminal detects the session message by using the parent application, and extracts, from the session message, data that conforms to the data format corresponding to the page path, to obtain the page path; and extracts, from the session message, data that conforms to the data format corresponding to the page parameter, to obtain the page parameter. The terminal may further transmits, by using the parent application, the extracted page path and page parameter to the child application logical layer processing unit. The child application logical layer processing unit then locates, according to the transmitted page path and page parameter, a corresponding target shared page that belongs to the child application corresponding to the child application identifier.

In this embodiment, the target shared page needing to be shared may be accurately located by adding the page path and the page parameter to the session message, to accurately share content intended to be shared.

In an embodiment, after locating the target shared page by using the parent application, the terminal may obtain a download address of page data included in the target shared page and associated with a session identifier, and download, according to the download address, the page data included in the target shared page and associated with the session identifier, to obtain page data used for rendering a child application page.

In the foregoing embodiment, a manner of sharing the particular page belonging to the child application is provided, improving diversity and flexibility of content to be shared.

Figure 5:
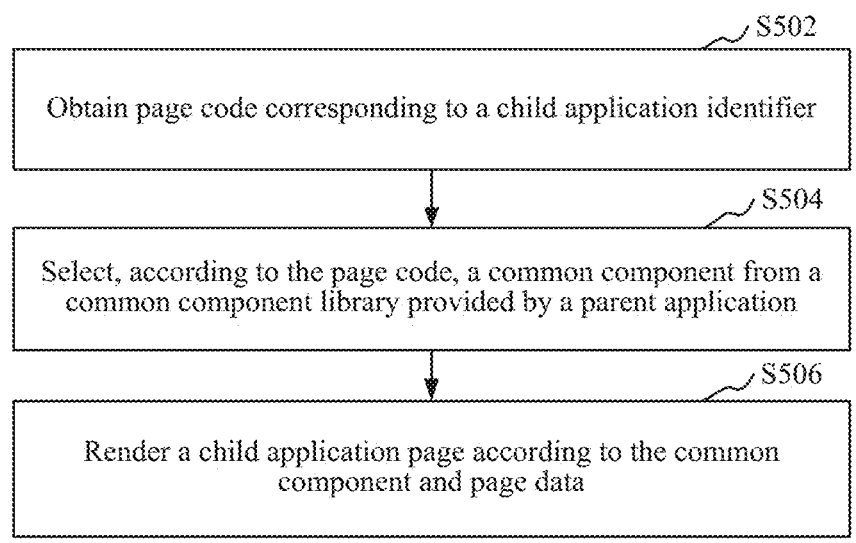
FIG. 5 is a schematic flowchart of a step of rendering, according to page data, a child application page in a child application that is invoked in an environment provided by the social networking application and that corresponds to a child application identifier.

As shown in FIG. 5, in an embodiment, step S310 specifically includes the following steps:

S502: Obtain page code corresponding to the child application identifier.

Specifically, the terminal may obtain, by using the parent application, a package corresponding to the child application identifier, and obtain the page code from the package. The page code may include page logic code, page structure code, and page style code. The package may be locally read, or may be downloaded from a server.

The page structure code is code that defines page composition. The page structure code may include an identifier of a common component included on a page. The page style code is code that defines a page style. The page logic code is code that defines processing logic of a corresponding child application page.

S504: Select, according to the page code, a common component from a common component library provided by the parent application.

Specifically, the terminal may execute the page structure code by using the child application view layer unit, and select, from a common component library according to the identifier of the common component defined in the executed page structure code, the common component corresponding to the identifier.

The common component library is stored locally on the terminal, and the common component library may be loaded by using the child application view layer unit after the child application view layer unit is created. The selected common component is a common component that is defined in the page structure code and that is needed when the child application page is generated.

The common component is a component shared by different child application pages, has a visual form, and is a composition unit of a child application page. The common component has a unique identifier that may be a name of the common component.

In an embodiment, the common component may be an icon, a text container, a progress bar, a form component, a navigation component, a media component, a map component, or a canvas component. The form component may include a button, a selection box, a form, a switch, and the like.

S506: Render a child application page according to the common component and page data.

Specifically, the terminal may obtain, by using the child application view layer unit, default component style data provided with the selected common component, thereby organizing the selected common component according to the default component style data and performing rendering, to form an initial child application page, and then fill the page data in the child application page, to obtain a child application page.

In an embodiment, the terminal may obtain, by using the child application view layer unit, page style code in a package of a child application, and draw a corresponding common component according to component style data corresponding to a selected common component in the page style code, to form a child application page.

In an embodiment, the page code corresponding to the child application identifier includes code used for accessing a plug-in. The method further includes: obtaining a corresponding the plug-in according to the code used for accessing the plug-in, and drawing the selected common component and the obtained plug-in, to form a corresponding child application page.

The plug-in is a functional component outside the common component library. The plug-in may be developed by a developer other than a developer of the child application and a developer of the parent application. The plug-in may implement a service such as a coupon, payment, or a membership. The plug-in may interact, by using an open service platform, with an access server corresponding to the plug-in, to process logic of the plug-in.

After the plug-in is introduced into the child application, a function outside the common component library may be obtained for the child application through extension, and development costs for re-development are avoided. In addition, the plug-in may be shared by a plurality of child applications, enriching a function of the child application.

In the foregoing embodiment, when the parent application is run, the child application page may be quickly constructed by using the common component provided by the parent application, reducing application installation duration, and improving application use efficiency.

In an embodiment, the method for processing a message in a group session further includes: sending a cooperative operation authorization request to a server corresponding to the child application; receiving an authorization response that is returned by the server in response to the cooperative operation authorization request; and granting, according to the authorization response, a permission of cooperatively operating the child application page in a member range of the group session to a user identifier that currently logs in.

The cooperative operation authorization request may be used for requesting to grant a permission of cooperatively operating the child application page with all other members of the group session to the user identifier that currently logs in. The cooperative operation authorization request may be used for requesting to grant a permission of cooperatively operating the child application page with some other members of the group session to the user identifier that currently logs in.

Specifically, after the terminal runs the child application by using the user identifier that currently logs in, and then the run child application renders the child application page according to the page data corresponding to the session identifier, the child application logical layer processing unit runs the logical code of the child application page, to initiate a cooperative operation authorization request. The child application logical layer processing unit then invokes a communications interface provided by the parent application, and uses the parent application to send the cooperative operation authorization request to the server corresponding to the child application. The server corresponding to the child application then returns an authorization response in response to the cooperative operation authorization request.

Further, after receiving the cooperative operation authorization request, the server corresponding to the child application may display corresponding authorization options, such as an authorization success option and an authorization failure option, and after detection an authorization option selection instruction, generate a corresponding authorization response according to an authorization option corresponding to the selection instruction, and return the authorization response to the terminal. The authorization response is a response to an authorization request, and is used to indicate an authorization success or an authorization failure.

Still further, after receiving the authorization response by using the parent application, the terminal transmits the authorization response to the child application logical processing unit. The child application logical processing unit then grants, according to the authorization response indicating the authorization success, the permission of cooperatively operating the child application page in the member range of the group session to the user identifier that currently logs in.

For example, it is assumed that the parent application is a WeChat program, and the child application is a document editing applet. When the terminal runs the document editing applet by using the user identifier that currently logs in, and loads a page corresponding to the document editing applet, the document editing applet may send, by using the WeChat program, a cooperative operation authorization request to a server corresponding to the document editing applet, to grant a permission of performing document editing together with other members of the group session to the user identifier that currently logs in.

In this embodiment, a way of cooperatively operating the child application page when a group corresponding to the group session in the parent application extends into the child application is provided, avoiding a complex operation and time consuming caused when a member in the group session needs to switch to the child application to re-establish a group to cooperatively operate the child application page, and improving application use efficiency.

In an embodiment, the method for processing a message in a group session further includes: after granting the permission to the user identifier, obtaining child application page data updated by using the user identifier; and synchronizing the updated child application page data in the member range of the group session.

Specifically, after the permission of cooperatively operating the child application page in the member range of the group session is granted to the user identifier that currently logs in, a data operation may be performed on the child application page within a scope of the permission according to the permission. For example, the data operation is changing data, adding data, or deleting data.

The terminal may obtain, by using the logical code, of the child application page, run by the child application logical layer processing unit, the child application page data updated by using the user identifier, and synchronize the updated child application page data in the member range of the group session.

In an embodiment, synchronizing the updated child application page data in the member range of the group session may be real-time synchronization, or may be periodic synchronization. The real-time synchronization may be instant synchronization performed when the page data is updated. The periodic synchronization may be synchronization performed according to a preset time interval. The preset time interval may be specifically 30 seconds or one minute. The synchronization in the member range of the group session may be directly performing, in a point-to-point communication manner, synchronization between terminals corresponding to members of the group session; or may be synchronizing the updated child application page data to the server by using the terminal, and then performing, by the server, synchronization in the member range of the group session.

In the foregoing embodiment, the child application page data that will be updated after the child application page is operated according to the permission of cooperatively operating the child application page is synchronized in the member range of the group session, ensuring page data accuracy when the child application page is cooperatively operated by using member identifiers.

In an embodiment, the method for processing a message in a group session further includes: obtaining a sharing instruction for sharing the child application corresponding to the child application identifier; determining a group session specified by the sharing instruction; and initiating, in the specified group session, a session message carrying the child application identifier.

Specifically, the child application logical layer processing unit may detect a triggering operation for the child application corresponding to the child application identifier, and trigger a sharing instruction when the corresponding triggering operation has been detected. The triggering operation may be a touch operation, a cursor click operation, or the like. The child application logical layer processing unit may display a corresponding group session list after triggering the sharing instruction. The group session list includes a group session participated in by the user identifier that currently logs in. After the child application logical layer processing unit has detected a selection instruction for the group session list, the child application logical layer processing unit determines, according to the selection instruction, a selected group session on which child application sharing is to be performed, and initiates, in the selected group session, a session message carrying a child application identifier.

In an embodiment, the terminal may obtain shared data or a download address of shared data of the child application by using the parent application, and add the shared data or the download address of the shared data to the session message. The shared data may be a screenshot of the child application page, or may be a screenshot of the child application page and text content associated with the child application.

In the foregoing embodiment, in the group session performed by the parent application, the child application sharing is performed by using the session message, and the receiver of the session message may directly enter the child application from the parent application, improving the application use efficiency.

Figure 6:
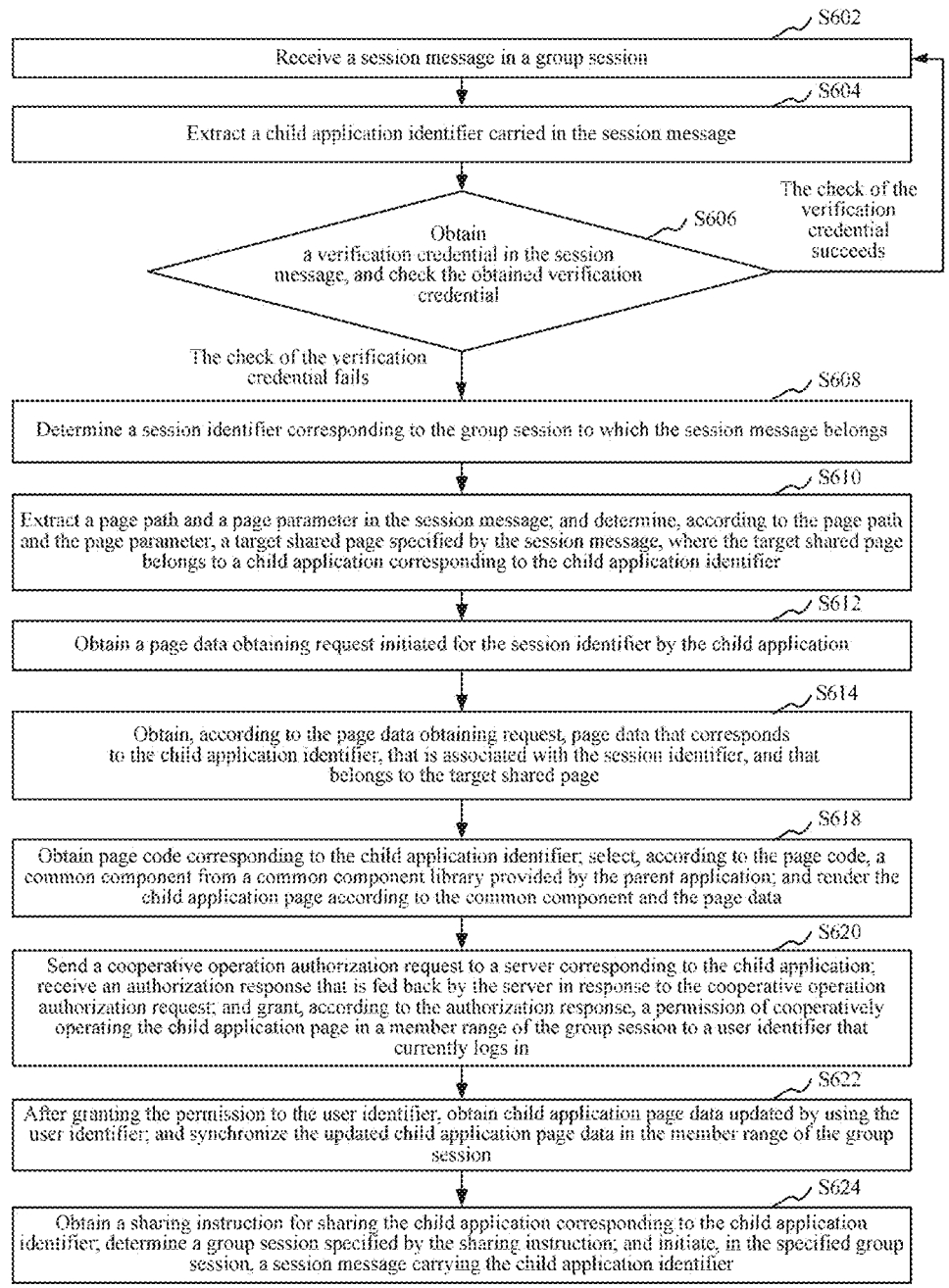
FIG. 6 is a schematic flowchart of a method for processing a message in a group session according to another embodiment.

As shown in FIG. 6, in a specific embodiment, the method for processing a message in a group session specifically includes the following steps:

S602: Receive a session message in a group session.

S604: Extract a child application identifier carried in the session message.

S606: Obtain a verification credential in the session message, and check the obtained verification credential; and if the check of the verification credential succeeds, perform step S608; or if the check of the verification credential fails, return to step S602.

S608: Determine a session identifier corresponding to the group session to which the session message belongs.

S610: Extract a page path and a page parameter in the session message; and determine, according to the page path and the page parameter, a target shared page specified by the session message, where the target shared page belongs to a child application corresponding to the child application identifier.

S612: Transmit the session identifier to the child application that is invoked in an environment provided by the social networking application and that corresponds to the child application identifier.

S614: Obtain a page data obtaining request initiated for the session identifier by the child application.

S616: Obtain, according to the page data obtaining request, page data that corresponds to the child application identifier, that is associated with the session identifier, and that belongs to the target shared page.

S618: Obtain page code corresponding to the child application identifier; select, according to the page code, a common component from a common component library provided by the parent application; and render the child application page according to the common component and the page data.

S620: Send a cooperative operation authorization request to a server corresponding to the child application; receive an authorization response that is returned by the server in response to the cooperative operation authorization request; and grant, according to the authorization response, a permission of cooperatively operating the child application page in a member range of the group session to a user identifier that currently logs in.

S622: After granting the permission to the user identifier, obtain child application page data updated by using the user identifier; and synchronize the updated child application page data in the member range of the group session.

S624: Obtain a sharing instruction for sharing the child application corresponding to the child application identifier; determine a group session specified by the sharing instruction; and initiate, in the specified group session, a session message carrying the child application identifier.

In this embodiment, the parent application is run in an OS, and then the parent application may receive the session message in the group session, extract the child application identifier carried in the session message, and determine the session identifier corresponding to the session message. In this way, the parent application may obtain, according to the child application identifier and the session identifier, the page data that corresponds to the child application identifier and that is associated with the session identifier, to implement the rendering of the child application page related to the session. In this way, when the parent application is run, the received message may be directly processed in the environment provided in the parent application, and subsequent data processing in a group session range may be performed, in the child application corresponding to the child application identifier, by using the rendered child application page related to the session, avoiding time consuming caused by switching to an application, targeted by the message, to perform message processing, and improving message processing efficiency. In addition, the child application page rendered after the message processing is completed is related to the session, avoiding interference caused by session-unrelated data to user use.

Figure 7:
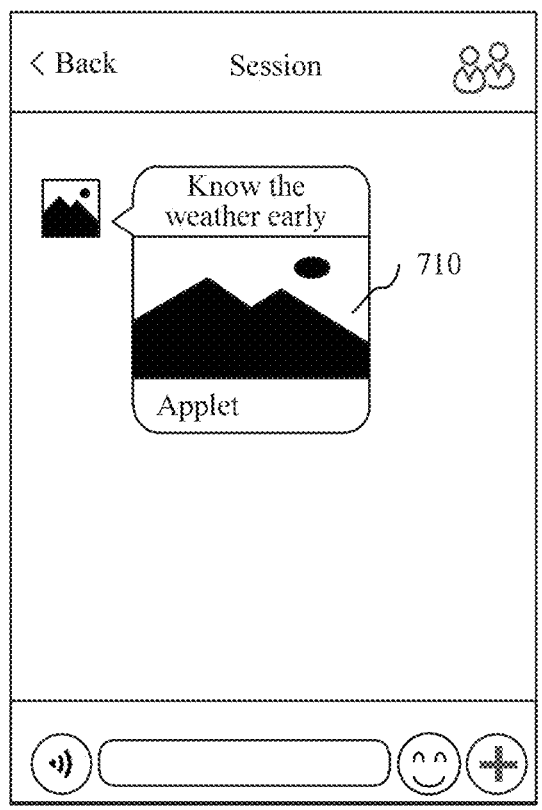
FIG. 7 is a schematic interface diagram of displaying message content of a session message on a session interface corresponding to the session message according to an embodiment.

FIG. 7 is a schematic interface diagram of displaying message content of a session message on a session interface corresponding to the session message according to an embodiment. Referring to FIG. 7, the interface includes the displayed message content 710 of the session message. After the message content 710 of the session message is displayed for a particular time, or after a triggering event for the message content 710 of the session message is detected, entering the interface shown in FIG. 8 may be triggered.

Figure 8:
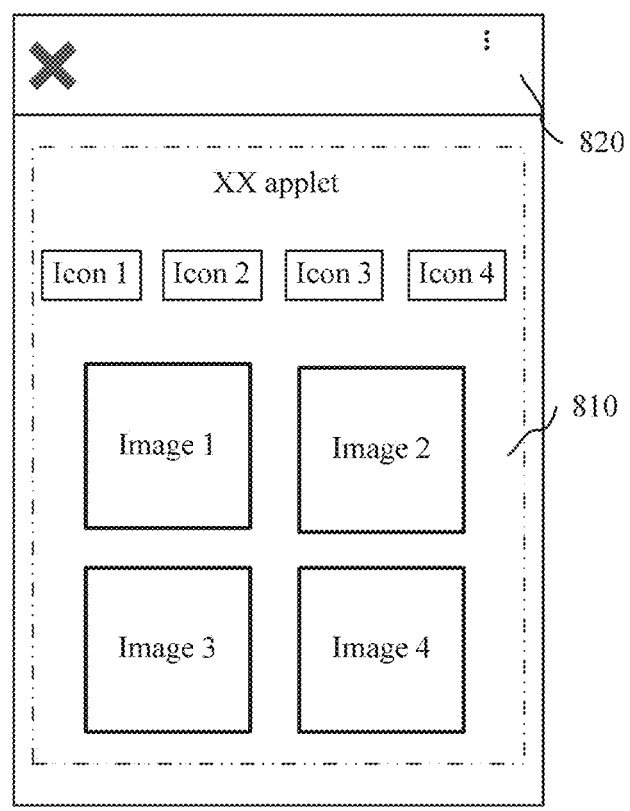
FIG. 8 is a schematic interface diagram of a child application page according to an embodiment.

FIG. 8 is a schematic interface diagram of a child application page according to an embodiment. Referring to FIG. 8, the interface includes a child application page 810. After a terminal is triggered to enter a child application, the child application may be directly run in an environment provided by a parent application, and a child application page may be loaded in the child application. The interface further includes an operation entry 820 configured to trigger sharing of the child application. The terminal may detect a triggering operation for the operation entry 820, and then trigger, according to a subsequent operation, a session message in a group session to perform the sharing of the child application.

It should be understood that although the steps in the embodiments of this application are not necessarily performed in an order indicated by the step numbers. Unless explicitly stated in this specification, the execution of these steps is not strictly sequential, and these steps may be executed in another sequence. Moreover, at least some of the steps in each embodiment may include a plurality of sub-steps or stages, which may not necessarily be completed at the same moment, but may be performed at different moments. These sub-steps or stages are not necessarily performed in sequence, but may be performed in turn or alternately with at least some of other steps or sub-steps or stages of the other steps.

Figure 9:
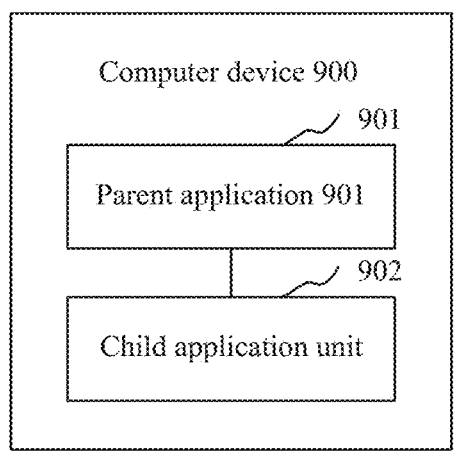
FIG. 9 is a structural block diagram of a computer device in a group session according to an embodiment.

As shown in FIG. 9, an embodiment provides a computer device 900. For an internal structure of the computer device 900, refer to the structure shown in FIG. 2. Some or all of the following modules may be implemented by using software, hardware, or a combination thereof. Referring to FIG. 9, the computer device 900 includes a parent application 901 and a child application unit 902. The child application unit 902 may include a child application view layer unit and a child application logical layer unit.

The parent application 901 is configured to: receive a session message in a group session; extract a child application identifier carried by the session message; determine a session identifier corresponding to the group session to Which the session message belongs; and obtain page data that corresponds to the child application identifier and that is associated with the session identifier.

The child application unit 902 is configured to render, according to the page data, a child application page in a child application that is run in an environment provided by the parent application and that corresponds to the child application identifier.

According to the computer device 900, the parent application is run in an OS, and then the parent application may receive the session message in the group session, extract the child application identifier carried in the session message, and determine the session identifier corresponding to the session message. In this way, the parent application may obtain, according to the child application identifier and the session identifier, the page data that corresponds to the child application identifier and that is associated with the session identifier, to implement the rendering of the child application page related to the session. In this way, when the parent application is run, the received message may be directly processed in the environment provided in the parent application, and subsequent data processing in a group session range may be performed, in the child application corresponding to the child application identifier, by using the rendered child application page related to the session, avoiding time consuming caused by switching to an application, targeted by the message, to perform message processing, and improving, message processing efficiency. In addition, the child application page rendered after the message processing is completed is related to the session, avoiding interference caused by session-unrelated data to user use.

In an embodiment, the parent application 901 is further configured to: obtain a verification credential in the session message; and when the check of the verification credential succeeds, transmit the session identifier to the child application that is run in the environment provided by the parent application and that corresponds to the child application identifier; obtain a page data obtaining request initiated for the session identifier by the child application; and obtain, according to the page data obtaining request, the page data corresponding to the child application identifier.

In this embodiment, the page data that corresponds to the child application identifier and that is associated with the session identifier, only after the check of the verification credential in the session message succeeds, and the rendering of the child application page is performed, ensuring security of the page data that is related to the group session and that belongs to the child application.

In an embodiment, the parent application 901 is further configured to: determine a target shared page specified by the session message, where the target shared page belongs to the child application corresponding to the child application identifier; and obtain page data that corresponds to the child application identifier, that is associated with the session identifier, and that belongs to the target shared page. The child application unit 902 is further configured to render, according to the page data, the target shared page belonging to the child application.

In this embodiment, a manner of sharing the particular page belonging to the child application is provided, improving diversity and flexibility of content to be shared.

In an embodiment, the parent application unit 901 is further configured to: extract a page path and a page parameter in the session message; and determine, according to the page path and the page parameter, a target shared page specified by the session message.

In this embodiment, the target shared page needing to be shared may be accurately located by adding the page path and the page parameter to the session message, to accurately share content intended to be shared.

In an embodiment, the child application unit 902 is further configured to: obtain page code corresponding to the child application identifier; and select, according to the page code, a common component from a common component library provided by the parent application; and render a child application page according to the common component and page data.

In this embodiment, when the parent application is run, the child application page may be quickly constructed by using the common component provided by the parent application, reducing application installation duration, and improving application use efficiency.

In an embodiment, the parent application 901 is further configured to: send a cooperative operation authorization request to a server corresponding to the child application; receive an authorization response that is returned by the server in response to the cooperative operation authorization request; and grant, according to the authorization response, a permission of cooperatively operating the child application page in a member range of the group session to a user identifier that currently logs in.

In this embodiment, a way of cooperatively operating the child application page when a group corresponding to the group session in the parent application extends into the child application is provided, avoiding a complex operation and time consuming caused when a member in the group session needs to switch to the child application to re-establish a group to cooperatively operate the child application page, and improving application use efficiency.

In an embodiment, the parent application 901 is further configured to: after granting the permission to the user identifier, obtain child application page data updated by using the user identifier; and synchronize the updated child application page data in the member range of the group session.

In this embodiment, the child application page data that will be updated after the child application page is operated according to the permission of cooperatively operating the child application page is synchronized in the member range of the group session, ensuring page data accuracy when the child application page is cooperatively operated by using member identifiers.

In an embodiment, the parent application 901 is further configured to: obtain a sharing instruction for sharing the child application corresponding to the child application identifier; determine a group session specified by the sharing instruction; and initiate, in the specified group session, a session message carrying the child application identifier.

In this embodiment, in the group session performed by the parent application, the child application sharing is performed by using the session message, and the receiver of the session message may directly enter the child application from the parent application, improving the application use efficiency.

In an embodiment, one or more computer-readable storage mediums storing a computer-readable instruction are provided, and when the computer-readable instruction is executed by one or more processors, the one or more processors are caused to perform the following steps: receiving a session message in a group session; extracting a child application identifier carried in the session message; determining a session identifier corresponding to the group session to which the session message belongs; obtaining page data that corresponds to the child application identifier and that is associated with the session identifier; and rendering, according to the page data, a child application page in a child application that is invoked in an environment provided by the social networking application and that corresponds to the child application identifier.

According to the storage mediums, the parent application is run in an OS, and then the parent application may receive the session message in the group session, extract the child application identifier carried in the session message, and determine the session identifier corresponding to the session message. In this way, the parent application may obtain, according to the child application identifier and the session identifier, the page data that corresponds to the child application identifier and that is associated with the session identifier, to implement the rendering of the child application page related to the session. In this way, when the parent application is run, the received message may be directly processed in the environment provided in the parent application, and subsequent data processing in a group session range may be performed, in the child application corresponding to the child application identifier, by using the rendered child application page related to the session, avoiding time consuming caused by switching to an application, targeted by the message, to perform message processing, and improving message processing efficiency.

In an embodiment, the computer-readable instruction further causes the processors to perform the following steps: obtaining a verification credential in the session message: and checking the obtained verification credential. When the check of the verification credential succeeds, the obtaining page data that corresponds to the child application identifier and that is associated with the session identifier includes: transmitting the session identifier to the child application that is run in the environment provided by the parent application and that corresponds to the child application identifier; obtaining a page data obtaining request initiated for the session identifier by the child application; and obtaining, according to the page data obtaining request, the page data corresponding to the child application identifier.

In an embodiment, the obtaining page data that corresponds to the child application identifier and that is associated with the session identifier includes: determining a target shared page specified by the session message, where the target shared page belongs to the child application corresponding to the child application identifier; and obtaining page data that corresponds to the child application identifier, that is associated with the session identifier, and that belongs to the target shared page. The rendering, according to the page data, a child application page includes: rendering, according to the page data, the target shared page belonging to the child application.

In an embodiment, the determining a target shared page specified by the session message includes: extracting a page path and a page parameter in the session message; and determining, according to the page path and the page parameter, the target shared page specified by the session message.

In an embodiment, the rendering, according to the page data, a child application page in a child application that is invoked in an environment provided by the social networking application and that corresponds to the child application identifier includes: obtaining page code corresponding to the child application identifier; selecting, according to the page code, a common component from a common component library provided by the parent application; and rendering the child application page according to the common component and the page data.

In an embodiment, the computer-readable instruction further causes the processors to perform the following steps: sending a cooperative operation authorization request to a server corresponding to the child application; receiving an authorization response that is returned by the server in response to the cooperative operation authorization request; and granting, according to the authorization response, a permission of cooperatively operating the child application page in a member range of the group session to a user identifier that currently logs in.

In an embodiment, the computer-readable instruction further causes the processors to perform the following steps: after granting the permission to the user identifier, obtaining child application page data updated by using the user identifier; and synchronizing the updated child application page data in the member range of the group session.

In an embodiment, the computer-readable instruction further causes the processors to perform the following steps: obtaining a sharing instruction for sharing the child application corresponding to the child application identifier; determining a group session specified by the sharing instruction; and initiating, in the specified group session, a session message carrying the child application identifier.

In an embodiment, a computer device is provided. The computer device includes a memory and a processor. The memory stores a computer-readable instruction. When the computer-readable instruction is executed by the processor, the processor is caused to perform the following steps: receiving a session message in a group session; extracting a child application identifier carried in the session message; determining a session identifier corresponding to the group session to which the session message belongs; obtaining page data that corresponds to the child application identifier and that is associated with the session identifier; and rendering, according to the page data, a child application page in a child application that is invoked in an environment provided by the social networking application and that corresponds to the child application identifier.

In an embodiment, the computer-readable instruction further causes the processor to perform the following steps: obtaining a verification credential in the session message; and checking the obtained verification credential. When the check of the verification credential succeeds, the obtaining page data that corresponds to the child application identifier and that is associated with the session identifier includes: transmitting the session identifier to the child application that is run in the environment provided by the parent application and that corresponds to the child application identifier; obtaining a page data obtaining request initiated for the session identifier by the child application; and obtaining, according to the page data obtaining request, the page data corresponding to the child application identifier.

In an embodiment, the obtaining page data that corresponds to the child application identifier and that is associated with the session identifier includes: determining a target shared page specified by the session message, where the target shared page belongs to the child application corresponding to the child application identifier; and obtaining page data that corresponds to the child application identifier, that is associated with the session identifier, and that belongs to the target shared page. The rendering, according to the page data, a child application page includes: rendering, according to the page data, the target shared page belonging to the child application.

In an embodiment, the determining a target shared page specified by the session message includes: extracting a page path and a page parameter in the session message; and determining, according to the page path and the page parameter, the target shared page specified by the session message.

In an embodiment, the rendering, according to the page data, a child application page in a child application that is invoked in an environment provided by the social networking application and that corresponds to the child application identifier includes: obtaining page code corresponding to the child application identifier; selecting, according to the page code, a common component from a common component library provided by the parent application; and rendering the child application page according to the common component and the page data.

In an embodiment, the computer-readable instruction further causes the processor to perform the following steps: sending a cooperative operation authorization request to a server corresponding to the child application; receiving an authorization response that is returned by the server in response to the cooperative operation authorization request; and granting, according to the authorization response, a permission of cooperatively operating the child application page in a member range of the group session to a user identifier that currently logs in.

In an embodiment, the computer-readable instruction further causes the processor to perform the following steps: after granting the permission to the user identifier, obtaining child application page data updated by using the user identifier; and synchronizing the updated child application page data in the member range of the group session.

In an embodiment, the computer-readable instruction further causes the processor to perform the following steps: obtaining a sharing instruction for sharing the child application corresponding to the child application identifier; determining a group session specified by the sharing instruction; and initiating, in the specified group session, a session message carrying the child application identifier.

According to the computer device, the parent application is run in an OS, and then the parent application may receive the session message in the group session, extract the child application identifier carried in the session message, and determine the session identifier corresponding to the session message. In this way, the parent application may obtain, according to the child application identifier and the session identifier, the page data that corresponds to the child application identifier and that is associated with the session identifier, to implement the rendering of the child application page related to the session. In this way, when the parent application is run, the received message may be directly processed in the environment provided in the parent application, and subsequent data processing in a group session range may be performed, in the child application corresponding to the child application identifier, by using the rendered child application page related to the session, avoiding time consuming caused by switching to an application, targeted by the message, to perform message processing, and improving message processing efficiency.

A person of ordinary skill in the art may understand that all or some of the processes of the methods in the foregoing embodiments may be implemented by a computer program instructing relevant hardware. The program may be stored in a non-volatile computer-readable storage medium. When the program is run, the processes of the foregoing methods in the embodiments are performed. Any reference to a memory, a memory, a database, or other mediums in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. For description instead of limitation, the RAM may be in a plurality of forms such as a static RAM (SRAM), a dynamic RAM (DRAM), a synchronous DRAM (SDRAM), a dual data rate SDRAM (DDRSDRAM), an enhanced SDRAM (ESDRAM), a synchronization link (Synchlink) DRAM (SLDRAM), a Rambus (Rambus) direct RAM (RDRAM), a direct Rambus dynamic RAM (DRDRAM), and a Rambus dynamic RAM (RDRAM).

The technical features of the foregoing embodiments may be randomly combined. For the purpose of concise descriptions, not all possible combinations of the technical features in the foregoing embodiments are described, but as long as combinations of the technical features do not conflict each other, the combinations of the technical features should be considered as falling within the scope of this specification.

The foregoing embodiments only describe several implementations of this application, which are described specifically and in detail, and therefore cannot be construed as a limitation to the patent scope of the present disclosure. It should be noted that various changes and improvements may further be made by a person of ordinary skill in the art without departing from the idea of this application, and these changes and improvements all fall within the protection scope of this application. Therefore, the patent protection scope of this application shall be subject to the appended claims.

What is claimed is:

1. A method for processing a message in a group session of a social networking application performed at a computer device having one or more processors and memory storing a plurality of programs to be executed by the one or more processors, the method comprising:
   receiving, by the computer device, a session message in a group session;
   extracting, by the computer device, a child application identifier carried by the session message;
   determining, by the computer device, a session identifier corresponding to the group session to which the session message belongs;
   obtaining, by the computer device, a verification credential in the session message;
   checking, by the computer device, the verification credential;
   when the check of the verification credential succeeds:
      transmitting, by the computer device, the session identifier to a child application that is run in an environment provided by the social networking application and that corresponds to the child application identifier;
      obtaining, by the computer device, a page data obtaining request initiated for the session identifier by the child application;
      obtaining, by the computer device according to the page data obtaining request, page data that corresponds to the child application identifier; and
      rendering, by the computer device according to the page data, a child application page in the child application that is invoked in the environment provided by the social networking application and that corresponds to the child application identifier.

2. The method according to claim 1, wherein the obtaining, by the computer device, page data that corresponds to the child application identifier and that is associated with the session identifier comprises:
   determining, by the computer device, a target shared page specified by the session message, wherein the target shared page belongs to the child application corresponding to the child application identifier; and
   obtaining, by the computer device, page data that corresponds to the child application identifier, that is associated with the session identifier, and that belongs to the target shared page; and
   the rendering, by the computer device according to the page data, a child application page comprises:
   rendering, by the computer device according to the page data, the target shared page belonging to the child application.

3. The method according to claim 2, wherein the determining a target shared page specified by the session message comprises:
   extracting, by the computer device, a page path and a page parameter in the session message; and
   determining, by the computer device according to the page path and the page parameter, the target shared page specified by the session message.

4. The method according to claim 1, wherein, the rendering, according to the page data, a child application page in a child application that is invoked in an environment provided by the social networking application and that corresponds to the child application identifier comprises:
   obtaining, by the computer device, page code corresponding to the child application identifier;
   selecting, by the computer device according to the page code, a common component from a common component library provided by the social networking application; and
   rendering, by the computer device, the child application page according to the common component and the page data.

5. The method according to claim 1, further comprising:
   sending, by the computer device, a cooperative operation authorization request to a server corresponding to the child application;
   receiving, by the computer device, an authorization response that is returned by the server in response to the cooperative operation authorization request; and
   granting, by the computer device according to the authorization response, a permission of cooperatively operating the child application page in a member range of the group session to a user identifier that currently logs in.

6. The method according to claim 5, further comprising:
   after granting the permission to the user identifier, obtaining, by the computer device, the child application page data updated by using the user identifier; and
   synchronizing, by the computer device, the updated child application page data in the member range of the group session.

7. The method according to claim 1, further comprising:
   obtaining, by the computer device, a sharing instruction for sharing the child application corresponding to the child application identifier;
   determining, by the computer device, a group session specified by the sharing instruction; and initiating, by the computer device, in the specified group session, a session message carrying the child application identifier.

8. One or more non-transitory computer readable storage mediums storing a plurality of machine readable instructions in connection with a computer device having one or more processors, wherein the plurality of machine readable instructions, when executed by the one or more processors, cause the computer device to perform a plurality of operations including:
receiving a session message in a group session;
extracting a child application identifier carried in the session message;
determining, by the computer device, a session identifier corresponding to the group session to which the session message belongs;
obtaining, by the computer device, a verification credential in the session message;
checking, by the computer device, the verification credential;
when the check of the verification credential succeeds:
transmitting, by the computer device, the session identifier to a child application that is run in an environment provided by the social networking application and that corresponds to the child application identifier;
obtaining, by the computer device, a page data obtaining request initiated for the session identifier by the child application;
obtaining, by the computer device according to the page data obtaining request, page data that corresponds to the child application identifier; and
rendering, by the computer device according to the page data, a child application page in the child application that is invoked in the environment provided by the social networking application and that corresponds to the child application identifier.

9. The storage medium according to claim 8, wherein the obtaining page data that corresponds to the child application identifier and that is associated with the session identifier comprises:
determining a target shared page specified by the session message, wherein the target shared page belongs to the child application corresponding to the child application identifier; and
obtaining page data that corresponds to the child application identifier, that is associated with the session identifier, and that belongs to the target shared page; and
the rendering, according to the page data, a child application page comprises:
rendering, according to the page data, the target shared page belonging to the child application.

10. The storage mediums according to claim 8, wherein the plurality of operations further comprise:
sending a cooperative operation authorization request to a server corresponding to the child application;
receiving an authorization response that is returned by the server in response to the cooperative operation authorization request; and
granting, according to the authorization response, a permission of cooperatively operating the child application page in a member range of the group session to a user identifier that currently logs in.

11. The storage mediums according to claim 10, wherein the plurality of operations further comprise:

after granting the permission to the user identifier, obtaining the child application page data updated by using the user identifier; and
synchronizing the updated child application page data in the member range of the group session.

12. The storage mediums according to claim 8, wherein the plurality of operations further comprise:
obtaining a sharing instruction for sharing the child application corresponding to the child application identifier;
determining a group session specified by the sharing instruction; and
initiating, in the specified group session, a session message carrying the child application identifier.

13. A computer device, comprising memory and one or more processors, the memory storing a plurality of computer-readable instructions that, when executed by the one or more processors, cause the computer device to perform a plurality of operations including:
receiving a session message in a group session;
extracting a child application identifier carried in the session message;
determining, by the computer device, a session identifier corresponding to the group session to which the session message belongs;
obtaining, by the computer device, a verification credential in the session message;
checking, by the computer device, the verification credential;
when the check of the verification credential succeeds:
transmitting, by the computer device, the session identifier to a child application that is run in an environment provided by the social networking application and that corresponds to the child application identifier;
obtaining, by the computer device, a page data obtaining request initiated for the session identifier by the child application;
obtaining, by the computer device according to the page data obtaining request, page data that corresponds to the child application identifier and
rendering, by the computer device according to the page data, a child application page in the child application that is invoked in the environment provided by the social networking application and that corresponds to the child application identifier.

14. The computer device according to claim 13, wherein the obtaining page data that corresponds to the child application identifier and that is associated with the session identifier comprises:
determining a target shared page specified by the session message, wherein the target shared page belongs to the child application corresponding to the child application identifier; and
obtaining page data that corresponds to the child application identifier, that is associated with the session identifier, and that belongs to the target shared page; and
the rendering, according to the page data, a child application page comprises:
rendering, according to the page data, the target shared page belonging to the child application.

15. The computer device according to claim 13, wherein the plurality of operations further comprise:
sending a cooperative operation authorization request to a server corresponding to the child application;

receiving an authorization response that is returned by the server in response to the cooperative operation authorization request; and granting, according to the authorization response, a permission of cooperatively operating the child application page in a member range of the group session to a user identifier that currently logs in.

16. The computer device according to claim 15, wherein the plurality of operations further comprise:

after granting the permission to the user identifier, obtaining the child application page data updated by using the user identifier; and synchronizing the updated child application page data in the member range of the group session.

17. The computer device according to claim 13, wherein the plurality of operations further comprise:

obtaining a sharing instruction for sharing the child application corresponding to the child application identifier;

determining a group session specified by the sharing instruction; and initiating, in the specified group session, a session message carrying the child application identifier.

* * * * *